UNITED STATES PATENT OFFICE.

CHARLES ZIMMERLING, OF PHILADELPHIA, PENNSYLVANIA.

COMPOUND FOR SCRUBBING PAINT, FLOORS, &c.

SPECIFICATION forming part of Letters Patent No. 348,179, dated August 24, 1886.

Application filed December 3, 1885. Serial No. 184,603. (No specimens.)

*To all whom it may concern:*

Be it known that I, CHARLES ZIMMERLING, a citizen of the United States, residing in the city and county of Philadelphia, State of Pennsylvania, have invented a new and useful Improvement in Compounds for Scrubbing Paint, Floors, &c., which improvement is fully set forth in the following specification.

My invention consists of a composition of an insoluble material—as powdered flint, feldspar, quartz, &c., or their equivalents, which may have sharp abrasive qualities, and which serve as the base of the compound—with a slight percentage of some soluble crystalline or saponaceous matter which acts as a binding or adhesive substance to produce granulated flaky substance, and also as a lubricant, as will hereinafter appear.

In carrying out the invention I generally use about six hundred pounds of an insoluble base—such as flint, feldspar, &c.—with about ten pounds of alkali and sixty-five pounds of tallow. In the process of manufacture the alkali and tallow are heated until an adhesive mass results. It is then mixed with the insoluble base, and a gritty plastic mass is the result of the union.

My object is to produce a scrubbing compound for kitchen purposes that can be quickly and instantly applied by simply dipping a brush into the compound. It will be noticed that with the above mixture there is no chemical combination between the insoluble base and the adhesive material, it being a mere mechanical mixture. Consequently when the compound comes in contact with cold water the insoluble base, which is largely in excess, is immediately set free, and the lather or suds produced by the adhesive saponaceous material acts as a lubricant to the insoluble base, thereby greatly assisting it in its abrading and scrubbing operations when used upon floors, wood-work, &c. Very good results are also obtained when used upon kitchen utensils, as tins, sinks, &c.

In lieu of mixing the insoluble base with the above-described materials, I may mix it with soap, soap-stock, (oils, rosin, and alkali,) borax and soda, or their equivalents. The borax, and soda, being added either in the dry state or solution, will greatly improve the compound and hasten the process. If, after the materials have been thoroughly mixed, the compound is not sufficiently stiff to be immediately worked, it is placed upon the floor or in a machine that will produce the granulated flaky form. After having lost sufficient water it will assume, by raking, cutting, wiring, breaking through perforated openings, sieving, or otherwise manipulating, a granulated flaky appearance. If any portion requires reworking, it is placed in a mill for grinding to granulated flaky condition.

I do not confine myself to the size, shape, or form of the product, as the different sizes and shapes assumed depend greatly upon the time and nature of manipulating the material; nor do I limit myself to the precise details here mentioned, as I may vary the process and the proportions or their equivalents without departing from the principles of the invention, it being evident that the invention comprehends any adhesive or crystalline materials other than the above that will produce a like result, to accomplish the effect intended. To make a more finished article the product may be smoothed or polished in any desirable apparatus.

It will be seen from the above that I produce a scrubbing compound which may be packed in boxes and will be found convenient to use and work very rapidly when used with a scrubbing-brush.

Having thus described my invention, what I claim as new, and desire to secure by Letters Patent, is—

1. A new and improved scrubbing compound in granulated flaky form, substantially as described.

2. A scrubbing compound in a granulated flaky form and composed of an insoluble base with a soluble adhesive substance or substances, substantially as described.

3. The process or method herein described of manufacturing or producing a scrubbing compound, consisting in first mixing an insoluble base, such as pulverized flint, feldspar, quartz, &c., with any saponaceous substance, as soap, soap-stock, borax, soda, &c., and drying the same, then cutting or breaking the mixture, substantially as described, then grinding, polishing, or otherwise manipulating the mass so as to form a granulated flaky material, substantially as and for the purpose described.

CHARLES ZIMMERLING.

Witnesses:
JOHN A. WIEDERSHEIM,
A. P. GRANT.